United States Patent [19]
Bergeron

[11] 3,917,685
[45] Nov. 4, 1975

[54] PROCESS FOR PREPARING TRISODIUM NITRILOTRIACETATE

[75] Inventor: Charles R. Bergeron, Baton Rouge, La.

[73] Assignee: Ethyl Corporation, Richmond, Va.

[22] Filed: Mar. 22, 1971

[21] Appl. No.: 126,534

[52] U.S. Cl. .......................................... 260/534 E
[51] Int. Cl.² ....................................... C07C 99/10
[58] Field of Search ............................... 260/534 E

[56] References Cited
UNITED STATES PATENTS
3,183,262  5/1965  Singer et al. ............... 260/534 E
3,463,812  8/1969  Thunberg et al. ............ 260/534 E FOREIGN PATENTS OR APPLICATIONS
1,181,615  2/1970  United Kingdom ........... 260/534 E Primary Examiner—John F. Terapane
Attorney, Agent, or Firm—Donald L. Johnson; John F. Siebert; Shelton B. McAnelly

[57] ABSTRACT

It is disclosed that high purity alkali metal salts of nitrilo carboxylic acids are produced in good yield from corresponding nitriles by reaction with caustic in specified proportions to produce a solution of the salt. The solution is purified to reduce contaminants therein and is concentrated to produce crystallization of at least a part of the salt therefrom. The crystallized salt thus obtained is separated from a mother liquor and a portion of the mother liquor is recycled to the caustic reaction operation to recover salt and unreacted caustic contained therein.

11 Claims, 1 Drawing Figure

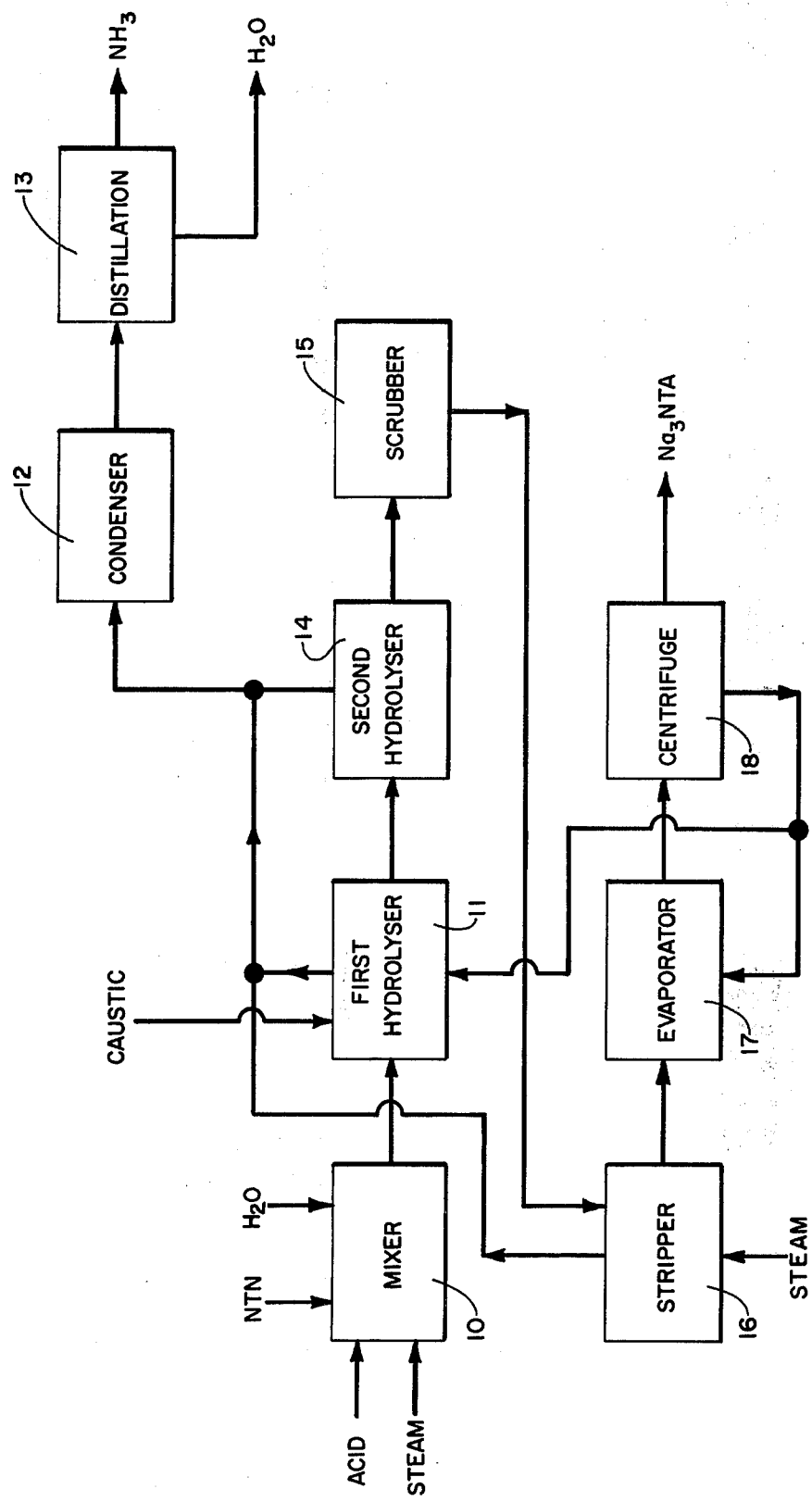

PROCESS FOR PREPARING TRISODIUM NITRILOTRIACETATE

BACKGROUND OF THE INVENTION

1. Field of the Invention

The invention relates to the preparation of metal salts of nitrilo carboxylic acids by reaction of caustic materials such as hydroxides, oxides or carbonates of the corresponding metals with the nitrile corresponding to the desired product nitrilo carboxylic acid salt. The salts are useful in various ways such as a detergent builder, and as an intermediate in chemical synthesis.

2. Description of the Prior Art

It is well known that nitriles will react with caustic alkali materials such as hydroxides, oxides and carbonates of alkali and alkaline earth metals to produce corresponding carbon skeleton metallic salts of the corresponding nitrilo carboxylic acid. One of the major problems in this conversion, however, is that of maintaining a concentration of caustic in the system which is adequate to produce rapid and complete conversion of the nitrile and low color of the resultant solution providing a low color product $Na_3NTA$ while at the same time avoiding overall conditions that will result in the presence of substantial amounts of caustic in the desired product. Another problem of the prior art in this area is that of removing ammonia produced as a by-product. A further problem in this area is that of providing for removal of color contamination in the product. Typical prior art in the area is British Intelligence Objectives Sub-Committee Final Report No. 1768, Item No. 22; U.S. Pat. Nos. 3,183,262 and 3,463,811; British Pat. Nos. 1,174,378; 1,181,615 and 1,202,133; Canadian Pat. Nos. 734,506; 829,333; and 843,991; Dutch Patent Publications Nos. 68,12431; 68,15426 and 68,17922; and German Offen. 1,813,718.

SUMMARY OF THE INVENTION

The present invention relates to a process for converting nitrilotriacetonitrile into particulate trisodium nitrilotriacetate which comprises reacting the nitrilotriacetonitrile with caustic in the presence of an excess of caustic above the stoichiometric amount required to convert the nitrilo triacetonitrile to trisodium nitrilotriacetate forming a solution of water, trisodium nitrilotriacetate and caustic wherein there is less than a precipitation amount of trisodium nitrilotriacetate and caustic. A precipitation amount is generally any excess above a saturation amount; however, in those instances where saturated or even supersaturated solutions can exist through the subsequent purification stages without precipitation, then such are less than precipitation amounts. The solution of water, trisodium nitrilotriacetate and caustic is then subjected to evaporation of water to exceed the precipitation minimum threshold to produce crystallization of a part of the trisodium nitrilotriacetic acid contained therein producing a mixture containing particulate or precipitated trisodium nitrilotriacetate and an aqueous mother liquor which contains trisodium nitrilotriacetate and caustic as solute. Said mixture is then subjected to separation to recover the particulate trisodium nitrilotriacetate from the mother liquor. A part of the mother liquor is fed to the subjecting to evaporation step and another part of the mother liquor is fed to the reacting step, the ratio of the part of the mother liquor fed to the evaporation step to that fed to the reacting step ranges from about 1:2 to about 20:1.

The amount of excess caustic fed at the reacting step ranges up to about 50 percent above the stoichiometric amount required to convert the nitrilotriacetonitrile fed to trisodium nitrilotriacetate.

A more preferred amount of excess caustic used in the reacting step is up to about 20 percent above the stoichiometric amount required to convert the nitrilotriacetonitrile fed to trisodium nitrilotriacetate. It is particularly preferred that the amount of caustic fed in the reacting step be no more than about 5 percent above the stoichiometric amount required to convert the nitrilotriacetonitrile fed to trisodium nitrilotriacetate.

Preferably, the caustic content of the aqueous mother liquor and the effluent from the reacting step is from about 0 up to about 5 percent by weight.

The ratio of the parts of mother liquor fed to the evaporation step relative to the parts fed to the reacting step is from about 1:2 to about 20:1. A more preferred ratio of the parts of mother liquor fed to the evaporation step relative to that fed to the reacting step is from about 1:1 to about 10:1. A particularly preferred ratio of the parts of mother liquor fed to the evaporation step relative to that fed to the reacting step is about 5:1.

The temperature of the reacting step is from about 150° to about 250°F, preferably from about 200° to about 230°F, typically about 215°F. The pressure of the reacting step is from about one half to about 2 atmospheres absolute, preferably about 1 atmosphere absolute.

Preferably, the reacting step is conducted at about the boiling point of the solution at an absolute pressure of about 1 atmosphere.

With reference now to the Figure, the apparatus shown therein includes a mixer 10 which receives nitrilotriacetonitrile and water to form a solution of nitrilotriacetonitrile which is preferably a concentrated solution to avoid excess volume but which is not saturated or supersaturated. This solution is held at a temperature of from about 175° to about 225°F, typically about 205°F, typically by way of direct injection of steam or by heat transfer using a jacket on the mixer or pipe coils placed within the mixer. To attain the maximum stability of this solution, it is desired that the solution be kept at a neutral or slightly acidic pH to which end a small amount of acid, typically sulfuric acid, is supplied to mixer 10 when necessary. Although the nitrilotriacetonitrile fed to mixer 10 is obtained from any suitable source, it preferably is produced by a reaction of ammonium sulfate, formaldehyde, and hydrogen cyanide, the nitrile being obtained as a crystallized product. In those instances where the crystallized nitrilotriacetonitrile is accompanied by residual acid, it is appropriate to reduce or eliminate the amount of acid supplied to the mixer 10. In any event, it is desired to avoid the existence of a basic pH in the solution of mixer 10 since in some instances this can cause initiation of a premature hydrolysis reaction which becomes cumulative due to the liberation of ammonia.

In those instances where the nitrilotriacetonitrile supplied to mixer 10 is accompanied by solid contaminants such as insoluble particulate matter, it is usually desirable to filter or otherwise purify the solution of mixer 10.

The NTN solution, preferably free of particulate solid or soluble contaminants, is fed to the first hydrolyzer 11 at which point it is combined with caustic, typically supplied as a 50 wt. percent aqueous solution. Preferably, the hydrolysis is at a temperature of from about 175° to about 225°F, typically about 215°F and is at atmospheric pressure under which conditions the solution contained therein boils. The steam and ammonia liberated are delivered to condenser 12 which is followed by a distillation device 13, which recovers the ammonia from the water. These are convention absorption and distillation operations known to those of ordinary skill in the art. Typically, the residence time in the first hydrolyzer 11 is about 45 minutes. The amount of caustic present in the hydrolyzer is important to achieve rapid and complete hydrolysis with low color level of resultant solution and product and at the same time avoid excessive amounts which tend to produce a high level of free caustic in the product $Na_3NTA$. Where stoichiometric or lesser amounts of caustic are used in hydrolysis, reaction times are prolonged, color of the hydrolysis effluent solution is higher and product quality tends to be poorer.

Liquid effluent from first hydrolyzer 11 flows to second hydrolyzer 14 which provides a continuation of the hydrolysis reaction similarly operating as a stirred boiling reactor at a temperature of about 215°F and at about atmospheric pressure. Preferably, the hydrolysis is conducted in two or more stages to maximize overall rate and achieve a high degree of completion of the reaction. Although the fresh caustic fed to the system for the hydrolysis reaction can be split into two parts, part of it going to each stage, it is generally preferred that the entire amount of fresh caustic fed to the hydrolysis system be supplied to the first hydrolyzer 11. Vapor boiled overhead from the second hydrolyzer 14 is delivered to the condenser 12 and distillation 13 as with the vapors from the first hydrolyzer 11. Typically, the second hydrolyzer 14 is about the same size as the first hydrolyzer 11, also providing an average residence time therein of about 45 minutes with an overall time for the two hydrolyzer stages being about an hour and 30 minutes.

The reaction in the hydrolyzers proceeds rapidly under the conditions described, being enhanced by the boiling operation which removes the by-product ammonia virtually as quickly as it is formed to influence the equilibrium to the product side. Preferably a true solution situation is maintained in the hydrolyzers so that avoiding saturation or supersaturation with respect to either caustic or the product trisodium nitrilotriacetate. Ordinarily, 80 percent or more of the hydrolysis occurs in the first stage 11. Usually the hydrolysis is almost complete, 95 percent or better after the second stage 14, and the reaction is brought to substantial completion in the subsequent manipulations of the system.

The existence of a true solution effluent from the second hydrolyzer 14 makes it possible to purify the solution further to remove contaminants such as color and odor bodies by the use of an absorption or adsorption scrubber or contactor 15. Typically, the scrubber 15 employs a porous bed packed with particulate activated carbon through which the trisodium NTA-caustic solution percolates providing an incidental benefit of additional hydrolysis contact time. In practice, some hydrolysis usually occurs in the scrubber 15, up to about 10 percent of the total but usually less such as up to about 5 percent of the total hydrolysis, resulting in the liberation therein of some ammonia which is carried through the scrubber 15 with the hydrolyzed liquid flowing therethrough. This ammonia, together with any residual ammonia present in the feed to the scrubber 15 is removed in a stripper 16 which also receives steam to assist in the ammonia removal. Stripper overhead is combined with the steam and ammonia vapor overhead from the first hydrolyzer 11 and the second hydrolyzer 14 and is delivered to condenser 12. Typically, the scrubber 15 operative with activated carbon operates at the same temperature as that used for hydrolysis in the first hydrolyzer 11 and the second hydrolyzer 14, viz. about 215°F.

The stripper 16 operates at somewhat higher temperatures, typically at a top temperature of about 215° to about 220°F and a bottom temperature of about 240°F, the difference in temperature between the top and the bottom being influenced to some extent by the presence of the ammonia at the top.

An important point with respect to the successful operation of the scrubber 15 is that the feed thereto must be a solution for effective color removal and that a solution condition must be maintained in 15 because any solid foreign matter or residual NTN, or caustic or precipitated $Na_3NTA$ caused by saturated or supersaturated solutions tends to deposit within the scrubber bed producing pluggage thereof.

Since it is usually desired to hold throughput volumes to a minimum to minimize equipment size, it is preferred therefore that the solution in hydrolysis become as concentrated in $Na_3NTA$ as is possible while still avoiding crystallization thereof in scrubber 15. Thus, it is desirable at this point to maintain as low as possible a concentration of caustic in the solution since caustic can produce a salting-out effect in certain concentrations reducing the amount of $Na_3NTA$ that can be contained in the solution. It is particularly desirable to avoid the region of from about 10 to about 20 percent caustic, and higher, in mother liquors or in the effluent from scrubber 15 since the solubility of trisodium NTA is undesirably low under such conditions necessitating the handling of undesirably large volumes of solution. Typically, therefore, one prefers to operate the system with no more than about 5 percent caustic present in the effluent from scrubber 15, with about 2 percent or less even more preferred.

Effluent from the stripper 16 is delivered to evaporator 17 which removes water to bring about the crystallization of trisodium NTA thereby producing a mixture containing particulate $Na_3NTA$ and an aqueous mother liquor which contains $Na_3NTA$ and caustic as solute.

The particulate $Na_3NTA$ thus produced is removed from the mother liquor as described by a suitable filtering device such as centrifuge 18 producing separate streams of product $Na_3NTA$ and mother liquor.

Due to the removal of water in the evaporator 17, the caustic content of the mother liquor is increased somewhat; however, it is desirable to hold this content low to minimize the amount of contamination of the product with caustic which inherently results from incomplete separation of the mother liquor from the particulate $Na_3NTA$ in the centrifuge 18. Typically, the mother liquor stream contains no more than about 5 percent by weight of caustic; however, it is evident that in those instances where caustic contamination of the product is less objectionable, one may operate at somewhat higher caustic concentrations to minimize the volumes of streams that are handled. In general, however, product purity considerations place an upper limit of about 10 percent caustic by weight on the mother liquor from centrifuge 18. A higher content of caustic is generally self-defeating because of the need for larger volumes of "wash water" applied to the solid $Na_3NTA$ in the centrifuge or in a subsequent operation.

The mother liquor obtained from the centrifuge 18 is split into two parts, one part being delivered to the first hydrolyzer 11 and the other part being delivered to the evaporator 17. The recirculation to the evaporator 17 is primarily for the purpose of recovering the valuable $Na_3NTA$ content of the mother liquor whereas the recirculation to the first hydrolyzer 11 provides not only recovery of the $Na_3NTA$ content but also provides a control over the caustic content throughout the entire hydrolyzer system including the evaporator 17. Typically, the ratio of the portion of the mother liquor fed to evaporator 17 to that fed to the first hydrolyzer 11 is about 5:1, such being a particularly desirable condition in that lower numerical ratios increase the volume of material that must be handled through the first hydrolyzer 11, second hydrolyzer 14, scrubber 15, and stripper 16 and higher numerical ratios increase the caustic concentration within the evaporator 17 with attendant problems resultant therefrom as pointed out in the foregoing.

Typically, the product trisodium NTA is washed lightly in centrifuge 18 and subsequently is dried to remove excess surface moisture producing a material which is suitable for use in detergent preparations as a builder or which may be used as a chemical intermediate in appropriate instances. Caustic content of product $Na_3NTA$ is easily held to less than 0.5 percent, and usually is less than 0.3 percent without the need for recrystallization. With recrystallization, even higher purities are attainable.

The following examples indicate preferred embodiments of the present invention.

EXAMPLE I

Apparatus was set up as in the Figure. On a proportions basis, 15.5 lbs/hr of solid NTN and 22.3 lbs/hr of water with a trace of acid were fed to mixer 10. This provided a pH within the mixer 10 of approximately 5.0. The temperature maintained in mixer 10 was 205°F.

The foregoing feed to mixer 10 provided a feed to the first hydrolyzer 11 containing 37.8 lbs/hr of solution. To this was added 27.8 lbs/hr of 50 percent sodium hydroxide solution and a recycle mother liquor stream from centrifuge 18 amounting to 14.0 lbs/hr. This recycle mother liquor stream contained 5 percent by weight sodium hydroxide and about a saturation amount of $Na_3NTA$ at the temperature of the recycle stream which was 190°F. The temperature in the first hydrolyzer 11 was 215°F. Average residence time in the first hydrolyzer 11 was 45 minutes. The pressure was 1 atmosphere. Approximately 90 percent completion of the hydrolysis reaction occurred in the first hydrolyzer 11.

The temperature of the second hydrolyzer 14 was 215°F with a residence time of 45 minutes and a pressure of 1 atmosphere. Approximately 6 percent of the total hydrolysis occurred in the second hydrolyzer 14. The solution from the second hydrolyzer had a light straw color.

Scrubber 15 was operated at a temperature of 215°F and at 1 atmosphere pressure using activated carbon packing with a total residence time of 45 minutes. Hydrolysis was brought to substantial completion in scrubber 15. Effluent from scrubber 15 was a substantially clear solution. The clarified solution from scrubber 15 was fed to stripper 16 where residual ammonia was removed by stripping with steam at a pressure of 1 atmosphere. The feed for evaporator 17 was substantially ammonia free. Stripper 16 was packed with stainless steel pall rings of one-half inch nominal size.

Evaporator 17 was a single effect evaporator operative at an absolute pressure of one-half atmosphere and a temperature of 190°F. Fresh feed to evaporator 17 was 86 lbs/hr of a solution containing approximately 1.0 wt. percent caustic and slightly less than a saturation amount of trisodium NTA.

Evaporator 17 also received a subsidiary feed stream of 104 lbs/hr of mother liquor from centrifuge 18, providing a total feed to evaporator 17 of 190 lbs/hr. The ratio of mother liquor fed to the evaporator to mother liquor fed to hydrolysis 11 was 7.5:1.

Evaporator 17 was in a closed loop with centrifuge 18 with side streams of mother liquor delivered to first hydrolyzer 11 and of product $Na_3NTA$ removed by the centrifuge. The amount of $Na_3NTA$ removed was 31.3 lbs/hr.

The ammonia vapor stream from first hydrolyzer 11, second hydrolyzer 14 and stripper 16 was fed to condenser 12 and condensed at a temperature of 85°F and a pressure of 1 atmosphere to provide an ammonia solution for feed to distillation 13. In this case there was a feed of fresh water to condenser 12 to provide the properties indicated and improve the degree of absorption and recovery of ammonia.

Ammonia was recovered from the solution from condenser 12 by distillation 13 operative at a pressure of 200 psig with a bottoms temperature of about 330°F and a top temperature of about 220°F.

The caustic content of the product $Na_3NTA$ was 0.29 wt. percent.

EXAMPLE II

Example I was repeated with the following variation. The recycle mother liquor stream from centrifuge 18 to first hydrolyzer 11 amounted to 56 lbs/hr. Fresh feed to evaporator 17 was 128 lbs/hr of a solution containing approximately 2.2 wt. percent caustic and slightly less than a saturation amount of trisodium NTA.

Evaporator 17 also received a subsidiary feed stream of 62 lbs/hr of mother liquor from centrifuge 18, providing a total feed to evaporator 17 of 190 lbs/hr. The ratio of mother liquor fed to the evaporator to mother liquor fed to hydrolysis 11 was 1.1:1.

The caustic content of the product $Na_3NTA$ was 0.34 wt. percent.

EXAMPLE III

Example I was repeated with the following variations. The recycle mother liquor stream from centrifuge 18 to first hydrolyzer 11 amounted to 19 lbs/hr. The recycle mother liquor stream contained 15 percent by weight sodium hydroxide and about a saturation amount of $Na_3NTA$ at the temperature of the recycle stream which was 190°F. Fresh feed to evaporator 17 was 91 lbs/hr of a solution containing approximately 3.1 wt. percent caustic and slightly less than a saturation amount of trisodium NTA.

Evaporator 17 also received a subsidiary feed stream of 116 lbs/hr of mother liquor from centrifuge 18, providing a total feed to evaporator 17 of 207 lbs/hr. The ratio of mother liquor fed to the evaporator to mother liquor fed to hydrolysis 11 was 6.0:1.

The caustic content of the product Na₃NTA was 0.75 wt. percent.

EXAMPLE IV

Example II is repeated with the evaporator operative at a temperature of 220°F and at a pressure of about 1 atmosphere. Similar results are obtained.

I claim:

1. A process for converting nitrilotriacetonitrile into particulate trisodium nitrilotriacetate which comprises,
   reacting said nitrilotriacetonitrile with caustic in the presence of an excess of caustic alkali up to about 50 percent above the stoichiometric amount required to convert the nitrilotriacetonitrile to trisodium nitrilotriacetate forming a solution containing less than a precipitation amount of trisodium nitrilotriacetate and caustic,
   subjecting said solution to evaporation of water to produce crystallization of a part of the trisodium nitrilotriacetate contained therein producing a mixture containing particulate trisodium nitrilotriacetate and an aqueous mother liquor which contains trisodium nitrilotriacetate and caustic as solute,
   subjecting said mixture to separation to recover the particulate trisodium nitrilotriacetate from the mother liquor, and
   feeding a first part of the mother liquor to the evaporation step and a second part to the reacting step, the ratio of said first part to said second part ranging from about 1:2 to about 20:1.

2. The process of claim 1 wherein the excess caustic of the reacting step is up to about 20 percent above the stoichiometric amount required to convert the nitrilotriacetonitrile fed to trisodium nitrilotriacetate.

3. The process of claim 1 wherein the excess caustic of the reacting step is up to about 5 percent above the stoichiometric amount required to convert the nitrilotriacetonitrile fed to trisodium nitrilotriacetate.

4. The process of claim 1 wherein the ratio of the parts of mother liquor fed to the evaporation step relative to that fed to the reacting step is from about 1:1 to about 10:1.

5. The process of claim 1 wherein the ratio of the parts of mother liquor fed to the evaporation step relative to that fed to the reaction step is about 5:1.

6. The process of claim 1 wherein the temperature of the reacting step is at from about 150° to about 250°F.

7. The process of claim 1 wherein the temperature of the reacting step is at from about 200° to about 230°F.

8. The process of claim 1 wherein the reacting step is conducted at about the boiling point of the solution at an absolute pressure of about 1 atmosphere.

9. The process of claim 1 wherein the nitrilotriacetonitrile fed to the reacting step is in the form of an aqueous solution at a temperature of from about 175° to about 225°F.

10. A process for converting solid nitrilotriacetonitrile into solid trisodium nitrilotriacetate which comprises,
    dissolving the solid nitrilotriacetonitrile to form a concentrated aqueous solution thereof at a temperature of from about 175° to about 225°F,
    maintaining said solution at a neutral or slightly acidic pH,
    reacting said solution with sodium hydroxide in the presence of an excess of caustic of up to about 20 percent above the stoichiometric amount required for complete hydrolysis and in the presence of enough water to avoid the precipitation of trisodium nitrilotriacetonitrile,
    purifying the hydrolysis product by absorption or adsorption to remove contaminants therein,
    subjecting the purified hydrolysis product to evaporation of water to produce crystallization of a part of the trisodium nitrilotriacetate contained therein and an aqueous mother liquor,
    separating the solid trisodium nitrilotriacetate thus formed from the mother liquor,
    recycling a first part of the mother liquor to the evaporation step to recover additional trisodium nitrilotriacetate therefrom, and
    recycling a second part of the mother liquor to the hydrolysis step to provide at least a part of the sodium hydroxide required in that step whereby the concentration of caustic in the mother liquor is controlled to avoid exceeding a content of about 5 percent caustic in the mother liquor, the ratio of the mother liquor recycled to the evaporation to that recycled to hydrolysis being from about 1:1 to about 10:1.

11. A process for converting nitrilotriacetonitrile into particulate trisodium nitrilotriacetate which comprises,
    reacting said nitrilotriacetonitrile with caustic in the presence of an excess of caustic alkali above the stoichiometric amount required to convert the nitrilotriacetonitrile to trisodium nitrilotriacetate forming a solution containing less than a precipitation amount of trisodium nitrilotriacetate and caustic,
    subjecting said solution to evaporation of water to produce crystallization of a part of the trisodium nitrilotriacetate contained therein producing a mixture containing particulate trisodium nitrilotriacetate and an aqueous mother liquor which contains trisodium nitrilotriacetate and caustic as solute,
    subjecting said mixture to separation to recover the particulate trisodium nitrilotriacetate from the mother liquor, and
    feeding a first part of the mother liquor to the evaporation step and a second part to the reacting step, the ratio of said first part to said second part ranging from about 1:2 to about 20:1,
    the caustic content of the aqueous mother liquor being from about 0 up to about 5 percent by weight.

* * * * *